(12) United States Patent
Schueler et al.

(10) Patent No.: US 8,109,253 B2
(45) Date of Patent: Feb. 7, 2012

(54) METHOD FOR ASCERTAINING THE NOISE EMISSION OF AN INTERNAL COMBUSTION ENGINE

(75) Inventors: Matthias Schueler, Steinheim (DE); Michael Kessler, Weissach (DE); Mohamed Youssef, Nufringen (DE); Arnold Engber, Steinheim (DE); Axel Loeffler, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 1195 days.

(21) Appl. No.: 11/897,650

(22) Filed: Aug. 30, 2007

(65) Prior Publication Data

US 2008/0199016 A1    Aug. 21, 2008

(30) Foreign Application Priority Data

Aug. 30, 2006  (DE) .......................... 10 2006 040 656

(51) Int. Cl.
*F02P 5/00* (2006.01)
*F02P 5/145* (2006.01)
(52) U.S. Cl. .................................. 123/406.38; 701/111
(58) Field of Classification Search ............. 123/406.38, 123/406.37, 406.29, 406.21; 701/111; 73/35.04, 73/35.01
See application file for complete search history.

(56) References Cited

U.S. PATENT DOCUMENTS

| 4,391,126 | A  * | 7/1983 | van Zanten | 73/35.05 |
| 5,739,417 | A  * | 4/1998 | Grob et al. | 73/35.03 |
| 6,912,460 | B2 * | 6/2005 | Sauler et al. | 701/114 |
| 2006/0086177 | A1 * | 4/2006 | Okubo et al. | 73/35.12 |

* cited by examiner

*Primary Examiner* — Mahmoud Gimie
(74) *Attorney, Agent, or Firm* — Kenyon & Kenyon LLP

(57) ABSTRACT

Methods for ascertaining the combustion noises of an internal combustion engine need only a structure-borne noise sensor and may be carried out using little computing power.

19 Claims, 4 Drawing Sheets

METHOD FOR ASCERTAINING THE NOISE EMISSION OF AN INTERNAL COMBUSTION ENGINE

CROSS-REFERENCE TO RELATED APPLICATIONS

The present application claims priority to Application No. 10 2006 040 656.7, filed in the Federal Republic of Germany on Aug. 30, 2006, which is expressly incorporated herein in its entirety by reference thereto.

FIELD OF THE INVENTION

The present invention relates to a method for ascertaining the noise emission of an internal combustion engine.

BACKGROUND INFORMATION

Today's internal combustion engines must operate with minimum noise, in addition to low fuel consumption and low emission values.

Mainly in internal combustion engines working by the diesel process, noise emissions should be paid particular attention to. In diesel engines, partially homogeneous and homogeneous combustion processes are used in partial areas of the engine's characteristics map in addition to the conventional, non-homogeneous combustion process in order to achieve minimum emission levels, in particular for nitrogen oxides and soot particles, in these partial areas of the operating characteristics map.

However, due to the high ignition delay, homogeneous and partially homogeneous combustions exhibit intolerable noise emissions, which cannot be fully avoided using measures such as an increased exhaust gas recirculation rate or retarded combustion. Mainly, the transition from a conventional non-homogeneous combustion process to a partially homogeneous or homogeneous combustion process and dynamic changes in the operating state may result in critical noise emissions. To be able to avoid or at least reduce these noise emissions using suitable injection strategies, the noise emissions must be ascertained during the operation of the internal combustion engine.

In a conventional method for detecting the combustion noise, the pressure in the combustion chamber is detected, weighted using a transmission function of the engine block and of the human hearing, and the emitted sound power is computed therefrom. These calculations are very computation-intensive and therefore cannot be implemented in the engine control units normally used today. In addition, internal combustion engines must be equipped with pressure sensors in the combustion chambers for carrying out this method.

SUMMARY

Example embodiments of the present invention provide a method for ascertaining the noise emissions of an internal combustion engine which requires short computation times and needs only a simple sensor system.

According to example embodiments of the present invention, a method for ascertaining the noise emissions of an internal combustion engine includes: detecting the structure-borne noise of the internal combustion engine using at least one structure-borne noise sensor; and ascertaining the energy of the structure-borne noise in a certain frequency band.

This method requires only at least one structure-borne noise sensor which is present in many internal combustion engines anyway and is also significantly more cost-effective than a pressure sensor that is installed in the combustion chamber of the internal combustion engine. Furthermore, the energy of the structure-borne noise in a certain frequency band may be ascertained using relatively few computing operations, so that conventional control units such as those used for controlling an internal combustion engine may take over this function in addition to engine control. This makes it possible to monitor the noise emissions of the internal combustion engine, its combustion noise in particular, in a simple manner and during the operation of the engine. Using the noise emissions thus ascertained, the internal combustion engine may be controlled and regulated by the control unit as a function of the noise emissions and the combustion noise.

The structure-borne noise signal detected by a structure-borne noise sensor may be filtered with the aid of a band-pass filter. This band-pass filter may be arranged such that it simulates the transmission function of the internal combustion engine, in particular of the engine block of the internal combustion engine, and of the human hearing. This ensures that ultimately only those components of the structure-borne noise signal are used for ascertaining the energy of the structure-borne noise signal which are emitted by the internal combustion engine and are perceived by the human ear as noise.

The number of the signals to be processed is thus reduced without the need to accept quality losses in the result in ascertaining the noise emissions.

In a further step, an absolute value or a square of the unfiltered or filtered structure-borne noise signal may be computed and added up.

Subsequently the added up absolute value or the added up square of the unfiltered or filtered structure-borne noise signal may be standardized using the following equations:

$$u = (\chi - \mu)/\delta; \text{ and}$$

$$v = \delta \times \mu;$$

in which:
  $\chi$ represents a structure-borne noise signal;
  $\mu$ represents an expected value;
  $\delta$ represents a standard deviation; and
  $v$ represents a density.

This standardization or normalization allows the ascertained noise emissions to be analyzed and further processed in a simple manner and may be used as an input variable in the control unit for controlling and regulating the internal combustion engine.

The frequency band within which the energy of the structure-borne noise signal is ascertained may be, e.g., between 0.5 kHz and 3.0 kHz.

According to example embodiments of the present invention, in a method for ascertaining the noise emissions of an internal combustion engine, the structure-borne noise of the internal combustion engine is detected using at least one structure-borne noise sensor and the maximum gradient of the low-frequency component of the structure-borne noise signal is ascertained.

In this method as well, merely at least one structure-borne noise sensor is required and the analysis of the structure-borne noise signals ascertained by the at least one structure-borne noise sensor also requires only a relatively low computing power.

It may be provided that the maximum gradient of the structure-borne noise signal is detected during the main combustion and/or during the pilot combustion. This makes it possible to ascertain the noise emissions both during the main combustion and during the pilot combustion as needed or, if no pilot injection and consequently no pilot combustion takes place, to detect only the noise emissions during the main combustion.

Furthermore, a weighted linear combination of the maximum gradient of the structure-borne noise signal may be formed during the main combustion and during the pilot combustion.

The maximum gradient of the structure-borne noise signal may be ascertained in a frequency band of, e.g., 1.6 kHz to 2.4 kHz, e.g., in the frequency band of 1.8 kHz to 2.2 kHz, and, e.g., in a frequency range of 2 kHz.

To reduce the load on the control unit, it may be furthermore provided that the method is carried out only when the operating state of the internal combustion engine changes. This method makes use of the realization that critical noise emissions occur in particular when the operating state of the internal combustion engine changes, and in steady-state operation this problem does not appear or at least it is so small that the noise emissions do not need to be permanently ascertained.

Further features and aspects of example embodiments of the present invention are described in further detail below with reference to the appended Figures. All features described above and below may be provided individually or in any combination.

DETAILED DESCRIPTION

Figure 1:
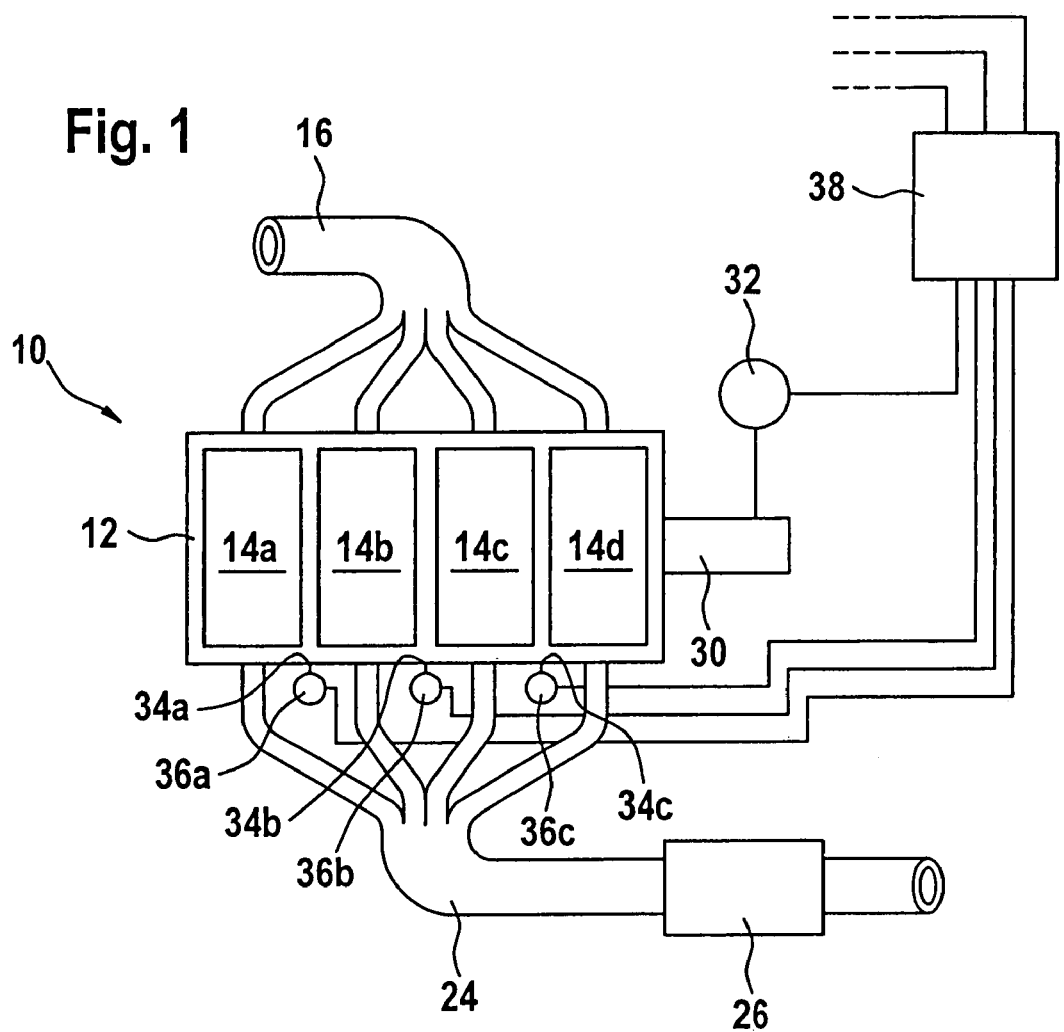
FIG. 1 schematically illustrates an internal combustion engine having four cylinders.

An internal combustion engine is labeled overall with reference numeral 10 in FIG. 1. It is used for driving a motor vehicle.

Internal combustion engine 10 includes an engine block 12 having four cylinders 14a to 14d, which receive intake air via an intake manifold 16. Combustion exhaust gases are removed from cylinders 14a through 14d with the aid of an exhaust gas manifold 24, in which a catalytic converter 26 is situated. A crankshaft 30, whose angular position and rotational speed are detected by a speed sensor 32, is set into rotation when engine 10 is operated.

A first structure-borne noise sensor 36a is situated on engine block 12 between cylinders 14a and 14b at an installation point 34a. A second structure-borne noise sensor 36b is situated between cylinders 14b and 14c at an installation point 34b, and a third structure-borne noise sensor 36c is situated between cylinders 14b and 14c at an installation point 34c.

All sensors 32 and 36a to 36c deliver structure-borne noise signals, using high time resolution, to a control and regulation unit 38 which controls and/or regulates the operation of internal combustion engine 10. For this purpose, different actuating elements are activated, for example, fuel injectors, etc.

Figure 2:
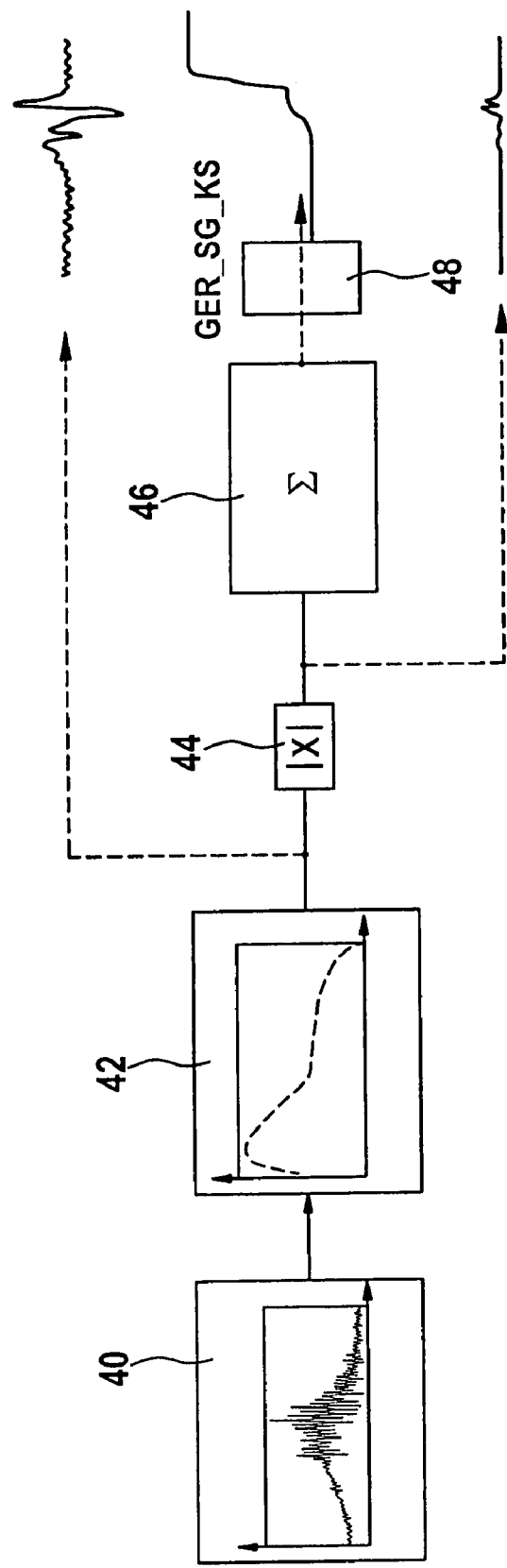
FIG. 2 schematically illustrates a method according to an example embodiment of the present invention.

FIG. 2 shows the sequence of a method according to an example embodiment of the present invention.

In a first block 40, the structure-borne noise signal is detected by one or more structure-borne noise sensors 36a, 36b, or 36c. The output signals of these structure-borne noise sensors 36 are filtered in a band-pass filter 42, which has the characteristic curve illustrated in FIG. 3, for example. Subsequently either an absolute value of the filtered structure-borne noise signals is formed in a second block 44, or the square of the structure-borne noise signal may also be formed.

In a summation block 46, the structure-borne noise signals are added up individually for each cylinder, the summation being restarted in each cycle of the internal combustion engine or for each cycle of the cylinder. A rotational angle range starts starting at a 30° crankshaft angle before top dead center at which the ignition (ignition TDC) takes place and ends at an approximately 70° crankshaft angle after ignition TDC. Within this total rotational angle range of approximately 100° crankshaft angle, structure-borne noise signals arise for each cylinder, caused by the combustion in this cylinder. The method hereof may detect and ascertain these structure-borne noise signals.

In a subsequent block 48, the added up structure-borne noise signals are normalized or standardized according to the following equations:

$$u = (\chi - \mu)/\delta; \text{ and}$$

$$v = \delta \times \mu$$

in which:
  $\chi$ represents a structure-borne noise signal;
  $\mu$ represents an expected value;
  $\delta$ represents a standard deviation; and
  $v$ represents a density.

Figure 3:
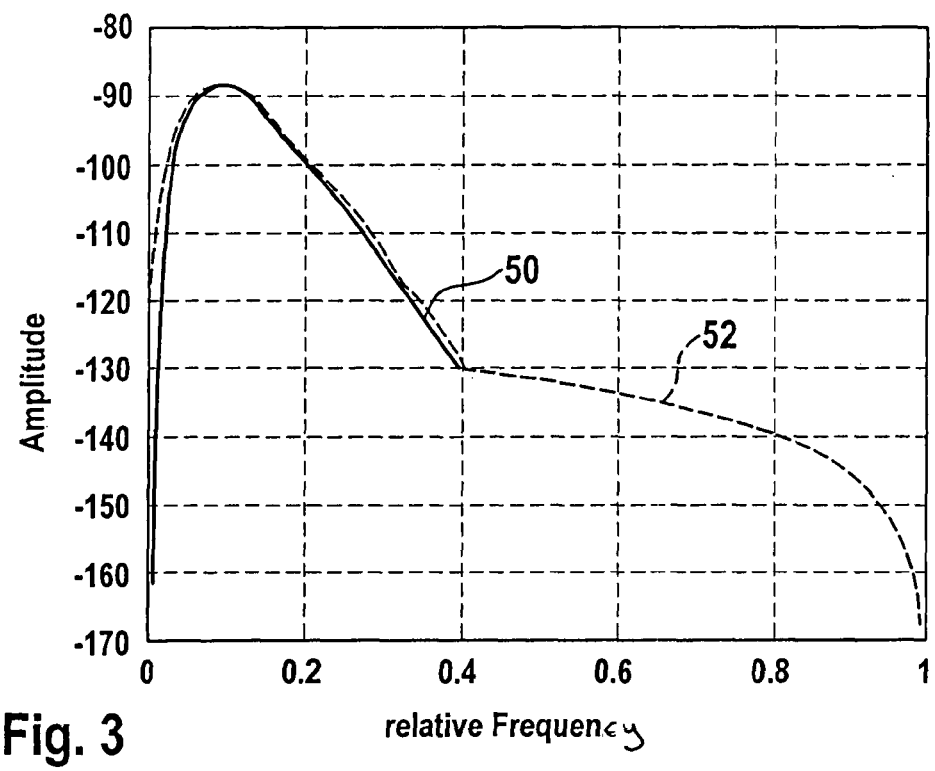
FIG. 3 schematically illustrates the characteristic curve of a band-pass filter.

In FIG. 3, the transmission function of the internal combustion engine and the so-called A-weighting of the structure-borne noise signals, which reflects the sensitivity of the human hearing as a function of the occurring frequencies, are shown by solid line 15. Dashed line 52 provides the characteristic curve of band-pass filter 42, which is used for carrying out the method.

Figure 4:
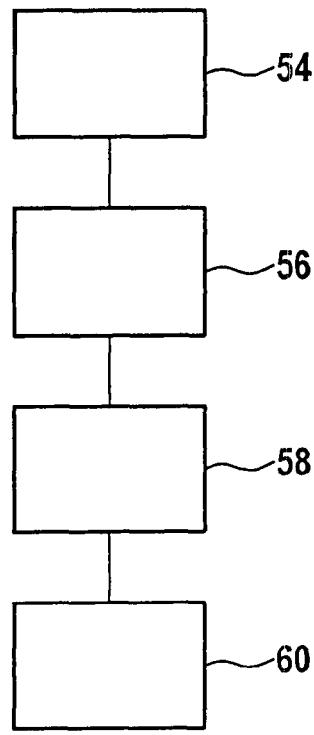
FIG. 4 schematically illustrates a method according to an example embodiment of the present invention.

FIG. 4 shows the sequence of the method according to an example embodiment of the present invention. The method starts in a start block 54. In a block 56, the structure-borne noise of the internal combustion engine is detected using at least one structure-borne noise sensor. The detection of the structure-borne noise signal is limited to the pilot combustion and/or the main combustion range. The structure-borne noise signals may be detected within a crankshaft angle range starting with a 30° crankshaft angle before ignition TDC and ending with an approximately 70° crankshaft angle after ignition TDC for each cylinder 14 of the internal combustion engine.

In a further block 58, the maximum gradients of the low-frequency component of the structure-borne noise signal are detected. The first time derivative of the structure-borne noise signal is identified as the gradient. Consequently, the structure-borne noise gradients are maximum at points in time at which the intensity of the structure-borne noise signal changes most rapidly.

A weighted linear combination of the maximum gradients of the structure-borne noise signal may be formed during the main combustion and during the pilot combustion. This optional formation of a linear combination is performed in block 60. The linear combination is performed according to the following equation:

$$DKS_{max} = (A \times DKS_{max, MI}) + (B \times DKS_{max, PI})$$

in which:

$DKS_{max, MI}$ represents a maximum gradient of the structure-borne noise during the main combustion;

$DKS_{max, PI}$ represents a maximum gradient of the structure-borne noise during the pilot combustion; and A, B represent constants;

where the following ranges may be specified as values for constants A and B:

A: 0 . . . 1; and

B: 0 . . . 1;

in which A+B=1.

The maximum gradient of the structure-borne noise signal may be analyzed in a frequency band from 1.6 kHz through 2.4 kHz.

An analysis frequency in the proximity of 2 kHz may be provided.

Figure 5:
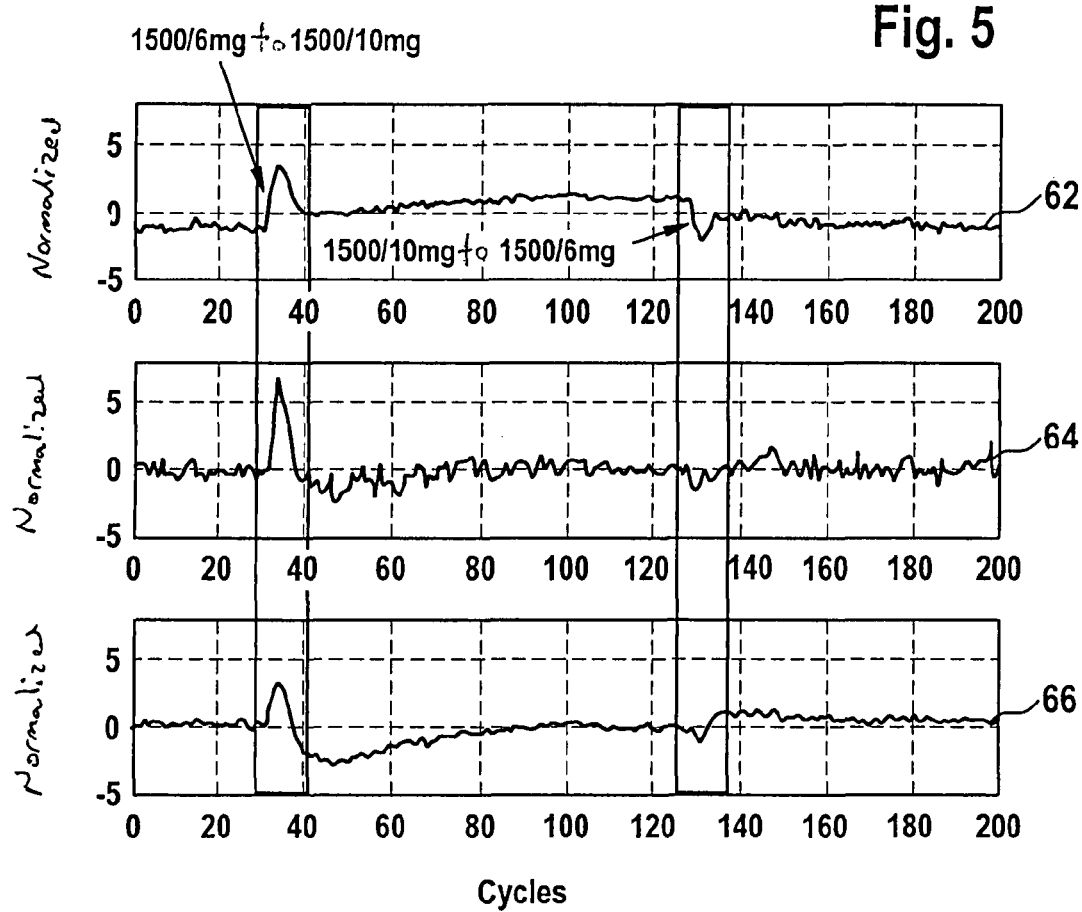
FIG. 5 schematically illustrates results of a method according to an example embodiment of the present invention.

FIG. 5 shows a conventional time-intensive computation method for ascertaining the structure-borne noise and methods according to example embodiments of the present invention.

A line 62 represents the emitted structure-borne noise of an internal combustion engine during 200 operating cycles. A sudden change in the injected amount takes place from the 30$^{th}$ to the 40$^{th}$ operating cycle. The injected quantity increases from 6 mg to approximately 10 mg.

In cycles 125 through 135, the injection quantity is again reduced from 10 mg to 6 mg. During these dynamic changes of the operating states of the internal combustion engine, the undesirably high noise emissions caused by the combustion occur in the internal combustion engine.

Line 62 the result of the structure-borne noise emissions ascertained according to a conventional method on the basis of detecting and evaluating the pressure prevailing in the combustion chamber. The computation of line 62 is very computing time-intensive and is used as a reference for the results of the method according to example embodiments of the present invention.

Line 64 shows the result of a method according to an example embodiment of the present invention according to which the energy of the structure-borne noise is ascertained in a certain frequency band, while line 66 shows the results of ascertaining the structure-borne noise with the aid of the maximum gradient of the low-frequency components of the structure-borne noise signal.

A comparison of reference line 62 with lines 64 and 66 clearly shows that both the method according to example embodiments of the present invention display the change in structure-borne noise emissions with sufficient accuracy in the critical ranges, so that either line 64 or line 66 are suitable input quantities for controlling and regulating the injection in control unit 38 such that these noise emissions are avoided.

Although lines 64 and 66 have the same relevance and quality regarding the noise emissions of the internal combustion engine as line 62, the computing time required for producing lines 64 and 66 is substantially less than is the case for line 62. For this reason, the method on which lines 64 and 66 are based may also be implemented in a control unit 38 of an internal combustion engine. In addition, the methods according to example embodiments of the present invention only require one or more structure-borne noise sensors 36, rather than a combustion chamber pressure sensor for each cylinder, which must also be linked to a high time-resolution crankshaft rotational angle detection, as does a conventional method.

What is claimed is:

1. A method for ascertaining noise emission of an internal combustion engine, comprising:

detecting a structure-borne noise of the internal combustion engine using at least one structure-borne noise sensor;

ascertaining an energy of the structure-borne noise signal in a certain frequency band; and computing and adding up separately for each cylinder of the internal combustion engine at least one of (a) an absolute value and (b) a square of at least one of (i) an unfiltered and (ii) a filtered structure-borne noise signal.

2. The method according to claim 1, further comprising:

filtering the structure-borne noise signal with a band-pass filter.

3. The method according to claim 1, wherein at least one of (a) the structure-borne noise signal is filtered and (b) the at least one of (i) the absolute value and (b) the square of the at least one of (a) the unfiltered and (b) the filtered structure-borne noise signal is formed and subsequently added up for each cylinder only within a rotational angle range of a crankshaft starting at an approximately 30° crankshaft angle before ignition TDC and ending at an approximately 70° crankshaft angle after ignition TDC.

4. The method according to claim 1, wherein the at least one of (a) the added-up absolute value and (b) the added up square of the at least one of (a) the unfiltered and (b) the filtered structure-borne signal is normalized using the following equations:

$$u=(\chi-\mu)/\delta, \text{ and}$$

$$v=\delta \times \mu,$$

wherein $\chi$ represents the structure-borne noise signal, $\mu$ represents an expected value, $\delta$ represents a standard deviation, and v represents a density.

5. The method according to claim 1, wherein the frequency band is between 0.5 kHz and 3.0 kHz.

6. The method for ascertaining noise emission of an internal combustion engine, the method comprising:

detecting a structure-borne noise of the internal combustion engine using at least one structure-borne noise sensor; and ascertaining a maximum gradient of a low-frequency component of the structure-borne noise signal.

7. The method according to claim 6, wherein the maximum gradient of the structure-borne noise signal is detected during at least one of (a) a main combustion and (b) a pilot combustion.

8. The method according to claim 6, wherein the maximum gradient of the structure-borne noise signal is ascertained in at least one of (a) a frequency band of 1.6 kHz to 2.4 kHz, (b) a frequency band of 1.8 kHz to 2.2 kHz, and (c) a frequency band of 1.95 kHz to 2.05 kHz.

9. The method according to claim 6, wherein the method is carried out only when an operating state of the internal combustion engine changes.

10. The method for ascertaining noise emission of an internal combustion engine, the method comprising:

detecting a structure-borne noise of the internal combustion engine using at least one structure-borne noise sensor; and ascertaining a maximum gradient of a low-frequency component of the structure-borne noise signal;

wherein the maximum gradient of the structure-borne noise signal is detected during at least one of (a) a main combustion and (b) a pilot combustion, wherein a weighted linear combination of the maximum gradient of the structure-borne noise signal is formed during the main combustion and during the pilot combustion according to the following:

$$DKS_{max} = (A \times DKS_{max,\,MI}) + (B \times DKS_{max,\,PI}),\text{ and}$$

wherein $DKS_{max,\,MI}$ represents the maximum gradient of the structure-borne noise during the main combustion, $DKS_{max,\,PI}$ represents the maximum gradient of the structure-borne noise during the pilot combustion, and A and B represent constants.

11. The method according to claim 10, wherein constant A has a value between 0 and 1, and constant B has a value between 0 and 1.

12. The method according to claim 11, wherein a sum of the constants A and B is equal to 1.

13. A computer-readable medium containing a computer program, which is executable by a processor, the method comprising:
    a program code arrangement having program code for ascertaining noise emission of an internal combustion engine, by performing the following:
        detecting a structure-borne noise of the internal combustion engine using at least one structure-borne noise sensor; and
        ascertaining a maximum gradient of a low-frequency component of the structure-borne noise signal.

14. The computer-readable medium according to claim 13, wherein a control unit configured to control the internal combustion engine includes the processor.

15. The computer-readable medium according to claim 13, wherein the computer-readable medium includes at least one of (a) a memory element, (b) a random-access memory, (c) a read-only memory, (d) a flash memory, (e) an optical memory device and (f) a magnetic memory device.

16. The computer-readable medium according to claim 13, wherein ascertaining an energy of the structure-borne noise signal in a certain frequency band is also performed.

17. A computer-readable medium containing a computer program, which is executable by a processor, the method comprising:
    a program code arrangement having program code for ascertaining noise emission of an internal combustion engine, by performing the following:
        detecting a structure-borne noise of the internal combustion engine using at least one structure-borne noise sensor;
        ascertaining an energy of the structure-borne noise signal in a certain frequency band; and
        computing and adding up separately for each cylinder of the internal combustion engine at least one of (a) an absolute value and (b) a square of at least one of (i) an unfiltered and (ii) a filtered structure-borne noise signal.

18. The computer-readable medium according to claim 17, wherein a control unit configured to control the internal combustion engine includes the processor.

19. The computer-readable medium according to claim 17, wherein the computer-readable medium includes at least one of (a) a memory element, (b) a random-access memory, (c) a read-only memory, (d) a flash memory, (e) an optical memory device and (f) a magnetic memory device.

* * * * *